US012080017B2

(12) United States Patent
Kimura et al.

(10) Patent No.: US 12,080,017 B2
(45) Date of Patent: Sep. 3, 2024

(54) INFORMATION PROCESSING DEVICE, PROCESSING METHOD, AND RECORDING MEDIUM

(71) Applicant: NEC Corporation, Tokyo (JP)

(72) Inventors: Masaaki Kimura, Tokyo (JP); Takahiro Matsui, Tokyo (JP)

(73) Assignee: NEC CORPORATION, Tokyo (JP)

( * ) Notice: Subject to any disclaimer, the term of this patent is extended or adjusted under 35 U.S.C. 154(b) by 376 days.

(21) Appl. No.: 17/436,353

(22) PCT Filed: Mar. 9, 2020

(86) PCT No.: PCT/JP2020/009932
§ 371 (c)(1),
(2) Date: Sep. 3, 2021

(87) PCT Pub. No.: WO2020/195738
PCT Pub. Date: Oct. 1, 2020

(65) Prior Publication Data
US 2022/0164977 A1    May 26, 2022

(30) Foreign Application Priority Data
Mar. 25, 2019    (JP) .................................. 2019-055883

(51) Int. Cl.
*G06T 7/70* (2017.01)
*G06Q 30/0601* (2023.01)
(52) U.S. Cl.
CPC .......... *G06T 7/70* (2017.01); *G06Q 30/0641* (2013.01); *G06T 2207/30196* (2013.01); *G06T 2207/30232* (2013.01)

(58) Field of Classification Search
None
See application file for complete search history.

(56) References Cited

U.S. PATENT DOCUMENTS

| 10,140,820 | B1 * | 11/2018 | Zalewski | G06Q 30/0633 |
| 10,282,720 | B1 * | 5/2019 | Buibas | G06Q 20/40 |
| 2006/0010027 | A1 * | 1/2006 | Redman | G06Q 10/063116 |
| | | | | 705/7.29 |

(Continued)

FOREIGN PATENT DOCUMENTS

| JP | 2015-153194 A | 8/2015 |
| JP | 2016-218822 A | 12/2016 |
| WO | WO-2018025384 A1 * | 2/2018 |

OTHER PUBLICATIONS

WO 2018/025384, Horiguchi et al., Information Processing Device, Information Processing Method, and Program (Macjhine Translation) 2018 (Year: 2018).*

(Continued)

*Primary Examiner* — Darlene Garcia-Guerra

(57) ABSTRACT

An information processing device system according to an aspect of the present disclosure includes: at least one memory configured to store instructions; and at least one processor configured to execute the instructions to: acquire a customer identifier (ID) that identifies a customer at a store; generate action information that represents an action of the customer in the store; and assign points in association with the customer ID based on the action information.

7 Claims, 12 Drawing Sheets

(56) References Cited

U.S. PATENT DOCUMENTS

| | | | | |
|---|---|---|---|---|
| 2009/0287557 | A1* | 11/2009 | Etheredge | G06Q 40/03 705/14.1 |
| 2010/0138037 | A1* | 6/2010 | Adelberg | G07F 9/001 700/241 |
| 2014/0278655 | A1* | 9/2014 | Sorensen | G06Q 30/0201 705/7.17 |
| 2017/0053330 | A1* | 2/2017 | Smith | G06Q 30/0613 |
| 2017/0308909 | A1* | 10/2017 | Faith | G06V 40/176 |
| 2019/0073616 | A1* | 3/2019 | Lewis | G06Q 10/06311 |

OTHER PUBLICATIONS

Mac-Vicar, Michael, et al. "Real-time recovering strategies on personnel scheduling in the retail industry." Computers & Industrial Engineering 113 (2017): 589-601 (Year: 2017).*

Senior, Andrew W., et al. "Video analytics for retail." 2007 IEEE conference on advanced video and signal based surveillance. IEEE, 2007 (Year: 2007).*

International Search Report for PCT Application No. PCT/JP2020/009932, mailed on Jun. 9, 2020.

English translation of Written opinion for PCT Application No. PCT/JP2020/009932, mailed on Jun. 9, 2020.

* cited by examiner

Fig.3

| IDENTIFYING ID | CUSTOMER FEATURE | IDENTIFYING ID | OWNED POINTS |
|---|---|---|---|
| AAA | dgher | 0001 | 64 |
| BBB | adfge | 0002 | 128 |
| CCC | grsg | 0003 | 256 |
| DDD | sdfa | 0004 | 512 |

Fig.4

| SHELF ID | PRODUCT ID | PRODUCT ID | PRODUCT ID | PRODUCT ID |
|---|---|---|---|---|
| SHELF A1 | X11 | X22 | X33 | X44 |
| SHELF A2 | Y11 | TY22 | RY3 | BY4 |
| SHELF A3 | Z11 | HT2 | F33 | S44 |
| SHELF B1 | RL1 | JK2 | JM3 | AC4 |
| SHELF B2 | FC1 | DF2 | GR3 | VD4 |
| SHELF B3 | SC1 | EE2 | WY3 | NP4 |
| ... | ... | ... | ... | ... |

(SHELF A rows: A1–A3; SHELF B rows: B1–B3)

Fig.7

| TIME POINT | CUSTOMER ID | SHELF ID | PRODUCT ID | ACTION INFORMATION |
|---|---|---|---|---|
| t1 | 0001 | — | — | MOVE (ENTER STORE) |
| t2 | 0001 | SHELF A1 | X11 | TAKE PRODUCT IN HANDS (FROM NEAR SIDE OF SHELF) |
| t3 | 0001 | | X11 | PUT PRODUCT IN BASKET |
| t4 | 0001 | SHELF A2 | Y11 | TAKE PRODUCT IN HANDS (FROM NEAR SIDE OF SHELF) |
| t5 | 0001 | SHELF A2 | Y11 | RETURN PRODUCT (TO ORIGINAL POSITION ON SHELF) |
| t6 | 0001 | — | — | MOVE |
| t7 | 0001 | SHELF B1 | JK2 | TAKE PRODUCT IN HANDS (FROM FAR SIDE OF SHELF) |
| t8 | 0001 | SHELF B2 | JK2 | RETURN PRODUCT (TO DIFFERENT POSITION ON SHELF) |
| t9 | 0001 | — | — | MOVE |
| t10 | 0001 | — | X11 | PRODUCT CHECKOUT |
| t11 | 0001 | — | — | MOVE (LEAVE STORE) |

Fig.9

| ACTION INFORMATION | DETERMINATION INFORMATION | NUMBER OF ASSIGNED POINTS |
|---|---|---|
| TAKE PRODUCT IN HANDS (FROM NEAR SIDE OF SHELF) | SECOND ACTION | 1 |
| TAKE PRODUCT IN HANDS (FROM FAR SIDE OF SHELF) | FIRST ACTION | −1 |
| RETURN PRODUCT (TO ORIGINAL POSITION ON SHELF) | SECOND ACTION | 1 |
| RETURN PRODUCT (TO DIFFERENT POSITION ON SHELF) | FIRST ACTION | −1 |
| PICK UP GARBAGE | SECOND ACTION | 1 |
| DROP GARBAGE | FIRST ACTION | −1 |
| RETURN DROPPED PRODUCT TO ORIGINAL POSITION | SECOND ACTION | 1 |
| TOUCH PRODUCT AND DROP PRODUCT | FIRST ACTION | −1 |
| NEATLY LINE UP CHAIRS IN EATING SPACE | SECOND ACTION | 1 |
| SPEAK LOUDLY | FIRST ACTION | −1 |

INFORMATION PROCESSING DEVICE, PROCESSING METHOD, AND RECORDING MEDIUM

This application is a National Stage Entry of PCT/JP2020/009932 filed on Mar. 9, 2020, which claims priority from Japanese Patent Application 2019-055883 filed on Mar. 25, 2019, the contents of all of which are incorporated herein by reference, in their entirety.

TECHNICAL FIELD

The present disclosure relates to an information processing device and the like.

BACKGROUND ART

The retail industry has grown by providing various products and services in response to consumer needs. Convenience stores (hereinafter abbreviated as CSs) provide services such as ticketing and proxy receipt of public utility charges in addition to product sales, thereby expanding opportunities for customers to visit stores. Meanwhile, the task of the store attendant is variously extended, such as cash register task, in-store cleaning, product shelf-stoking and display, brief cooking, and proxy service, and it is required to reduce the work of the store attendant while enhancing convenience for customers.

CITATION LIST

[Patent Literature]
[PTL 1] JP 2015-153194 A

SUMMARY OF INVENTION

Technical Problem

The work of the store attendant in the store is sometimes expanded by an action of a customer. For example, in a product shelf on which products are displayed in order, when a customer takes a product from the far side of the shelf, the display of the products is disturbed, and the store attendant will have to redisplay products on the disturbed product shelf. On the other hand, actions in which customers sequentially take products from the front maintain the display of the products, and the work of the store attendant will be reduced. In this manner, it is desired to achieve a service that leads to a reduction in work of the store attendant by causing the customer to be aware of an action of the customer that increases or decreases the work of the store attendant.

An object of the present disclosure is to provide an information processing device and the like that solve the above problems and provide a service that is beneficial to both a customer and a store attendant.

Solution to Problem

One aspect of an information processing device of the present disclosure includes: a customer ID acquisition unit that acquires a customer identifier (ID) that identifies a customer who uses a store; an action information generation unit that generates action information that represents an action of the customer in the store; and a point awarding unit that awards points in association with the customer ID based on the action information.

One mode of a processing method of the present disclosure includes: acquiring a customer ID that identifies a customer who uses a store; acquiring action information that represents an action of the customer in the store; and awarding points in association with the customer ID based on the action information.

One mode of a recording medium of the present disclosure causes a computer to execute: acquiring a customer ID that identifies a customer who uses a store; acquiring action information that represents an action of the customer in the store; and awarding points in association with the customer ID based on the action information.

One aspect of an information processing system of the present disclosure includes: an information processing device that includes: a customer ID acquisition unit that acquires a customer ID that identifies a customer who uses a store; an action information generation unit that generates action information that represents an action of the customer in the store; and a point awarding unit that awards points in association with the customer ID based on the action information; and a mobile terminal that receives point information regarding the points from the information processing device.

Advantageous Effects of Invention

According to the information processing device of the present disclosure, it is possible to provide a service that is beneficial to both a customer and a store attendant.

BRIEF DESCRIPTION OF DRAWINGS

FIG. 3 is a data sheet illustrating an example of customer information to be stored in a store database (DB).

FIG. 4 is a data sheet illustrating an example of product information stored in the store DB.

FIG. 7 is a data sheet illustrating an example of action information indicating actions of a customer in a store.

FIG. 9 is a data sheet illustrating an example of action determination information.

EXAMPLE EMBODIMENT

Hereinafter, an information processing system and an information processing device as an aspect of an example embodiment of the present disclosure will be described with reference to the drawings. The following explains an example in which the information processing system and the information processing device are applied to a retail store such as a convenience store. The store may be a child store such as a manpower saving store, an unattended store, a satellite store, or a stand, or a parent store that replenishes products of the child store.

First Example Embodiment

<Information Processing System>

Figure 1:
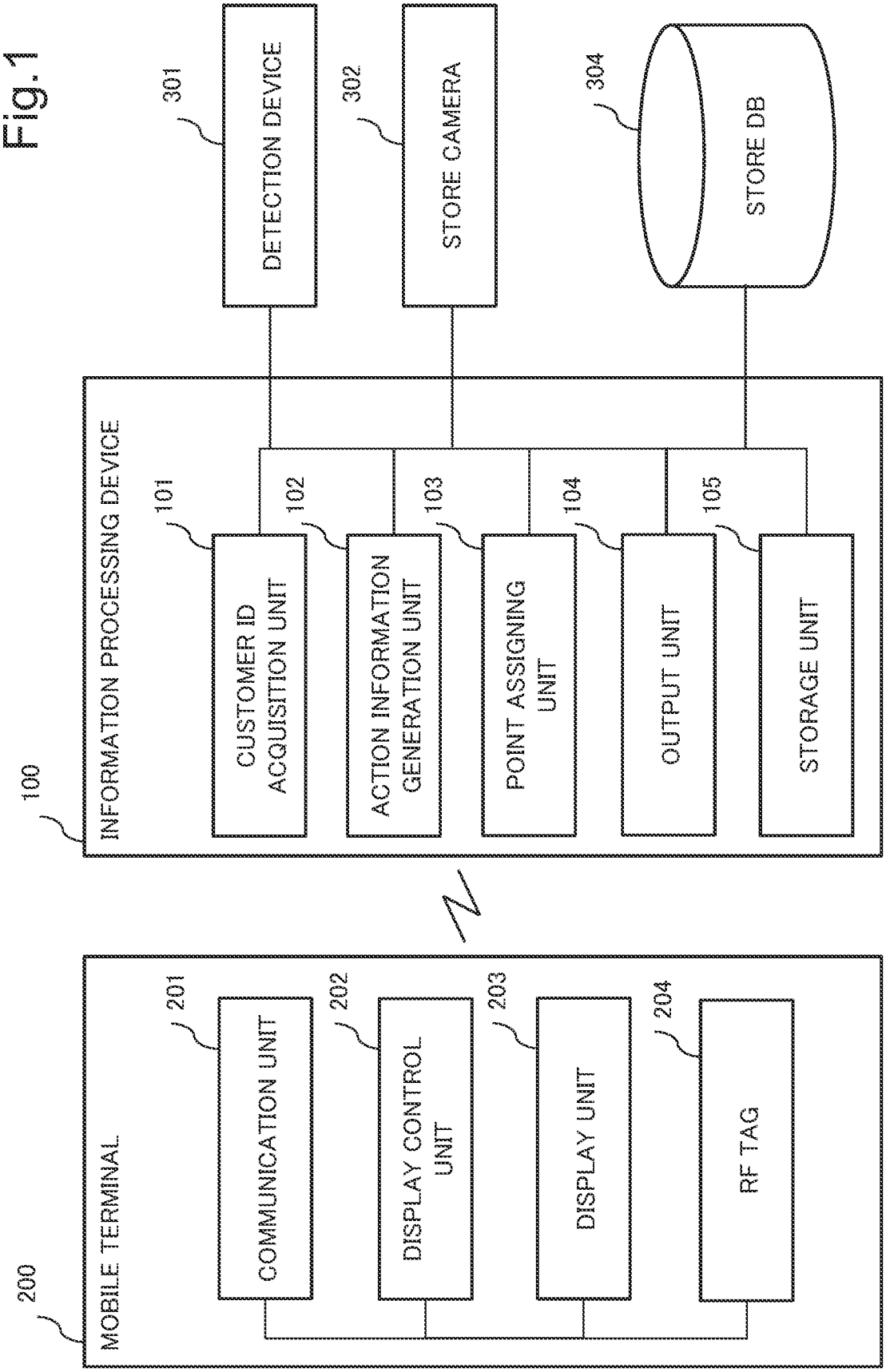
FIG. 1 is a block diagram illustrating an example of the configuration of an information processing system according to a first example embodiment.

FIG. 1 is a block diagram illustrating a configuration of an information processing system according to a first example embodiment. The information processing system illustrated in FIG. 1 includes an information processing device 100, a mobile terminal 200, a detection device 301, a store camera 302, and a store DB 304. The information processing device 100 is connected to each of the mobile terminal 200, the detection device 301, the store camera 302, and the store DB 304 in a manner that enables communication.

<Mobile Terminal>

The mobile terminal 200 is an information communication terminal used by a customer who uses a store. The mobile terminal 200 receives updated point information from the information processing device 100 and displays the point information of the customer. The mobile terminal 200 is, for example, a smartphone.

The mobile terminal 200 illustrated in FIG. 1 includes a communication unit 201, a display control unit 202, a display unit 203, and a radio frequency (RF) tag 204. The communication unit 201 receives the point information from the information processing device 100. The communication unit 201 passes the point information to the display control unit 202. The display control unit 202 performs display control in such a way as to display the received point information on the display unit 203. The RF tag 204 stores an identifying ID. The identifying ID is information for identifying an individual and is constituted by, for example, alphanumeric characters.

Each time a customer enters or leaves the store, the customer holds the radio frequency (RF) tag of the mobile terminal 200 over the detection device 301 installed in the store, and thus the identifying ID stored in the RF tag 204 is detected by the detection device 301.

The detection of the identifying ID of the customer is not limited to the RF tag of the mobile terminal 200. In addition to the RF tag, coded information by a two-dimensional code displayed by the mobile terminal 200 may be employed. Alternatively, biometric information such as the face, fingerprint, vein or the like of the customer may be used as the identifying ID instead of using the RF tag 204.

<Detection Device>

The detection device 301 illustrated in FIG. 1 is installed at an entrance of the store to detect a customer entering and leaving the store. Specifically, the detection device 301 detects the identifying ID for identifying a customer who enters and leaves the store. The identifying ID is, for example, ID information in the RF tag mounted on the mobile terminal 200, coded information by a two-dimensional code displayed by the mobile terminal 200, or biometric information such as a face, a fingerprint, or a vein of the customer. When the biometric information is used as the identifying ID, the detection device 301 serves as, for example, an imaging device, a fingerprint reading device, a vein reading device, an RF tag reading device, or a two-dimensional code reading device.

When the identifying ID is detected, the detection device 301 transmits the detected identifying ID to the information processing device 100. The information processing device 100 collates the detected identifying ID with the identifying ID stored in the store DB 304 and transmits a collation effectiveness notification to the detection device 301. The detection device 301 receives the collation effectiveness notification to inform the customer of the effectiveness of collation, using a buzzer, a lamp, or the like.

<Store Camera>

The store camera 302 illustrated in FIG. 1 captures the customer in the store and products sold in the store. Actions of the customer in the store from when the customer enters the store to when the customer leaves the store, such as movement, product browsing, and product checkout, are captured by the store camera 302, and the image of the customer in the store (hereinafter, referred to as a customer image) is transmitted to the information processing device 100. The phrase "the customer enters the store" means that the customer enters the inside of the store, and the phrase "the customer leaves the store" means that the customer goes outside of the store.

Figure 2:
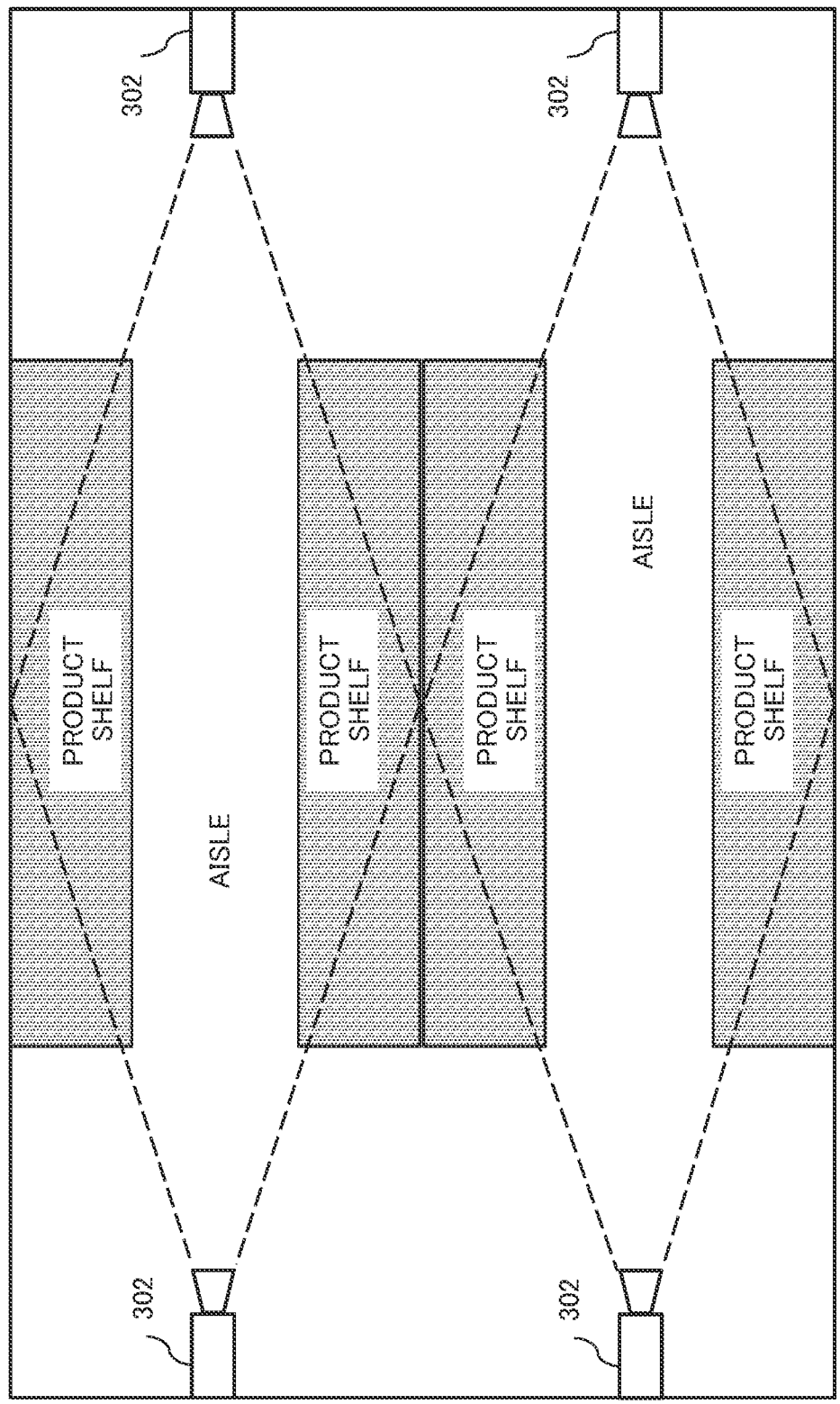
FIG. 2 is a plan view illustrating an example of the arrangement of store cameras in a store.

FIG. 2 is a plan view illustrating an example of the arrangement of the store cameras according to the first example embodiment. As illustrated in FIG. 2, a plurality of the store cameras 302 is arranged at positions where customers on aisles and products on product shelves can be captured. In FIG. 2, broken lines extending from the store cameras 302 represent the angles of view of the cameras. The number and arrangement of the store cameras 302 illustrated in FIG. 2 are examples, and the example embodiment is not limited to this example. A store camera 302 configured to capture only a customer may be added, or a store camera 302 configured to capture the entire product shelf or each product may be added.

<Store DB>

The store DB 304 is a database that stores information related to the store and a customer who uses the store. The store DB 304 stores customer information, product information, and the like.

FIG. 3 is a data sheet illustrating an example of the customer information stored in the store DB. The customer information contains an identifying ID, a customer ID, owned points, and the like of the customer. The customer ID is information for the store to identify the customer and is constituted by, for example, alphanumeric characters. The customer ID may be different for each store, or a common customer ID may be used among stores in a store group or a franchise chain. The point information contains the owned points of the customer associated with the customer information. Every time the information processing device 100 assigns a point to the customer, the owned points contained in the customer information are updated. The customer information contains in advance a customer feature extracted from the image of the customer. An example of the customer feature is a face feature of the customer.

FIG. 4 is a data sheet illustrating an example of the product information stored in the store DB. The product information contains a shelf ID of each product shelf arranged in the store and a product ID of every product placed on the product shelf. The shelf ID is an identifier for identifying a product shelf and shelf tiers of the product shelf, and the product ID is an identifier for identifying a product.

In the example illustrated in FIG. 4, a product shelf A constituted by three tiers is represented as shelf IDs "A1", "A2", and "A3" in order from the upper tier of the product shelf. A plurality of products placed on the same shelf tier is associated as product IDs with the same shelf ID. It is assumed that products are arrayed per product ID in a left-right direction of the product shelf, and products with the same product ID are displayed from the near side to the far side of the product shelf.

The product information contains a product feature extracted from the image of the product on the product shelf.

<Information Processing Device>

The information processing device 100 illustrated in FIG. 1 includes a customer ID acquisition unit 101, an action information generation unit 102, a point assigning unit 103, an output unit 104, and a storage unit 105.

The customer ID acquisition unit 101 acquires the customer ID that identifies a customer who uses the store. Specifically, the customer ID acquisition unit 101 collates the identifying ID detected by the detection device 301 with the identifying ID of the customer stored in advance in the store DB 304. When the identifying IDs match, the customer ID acquisition unit 101 acquires the customer ID associated with the identifying ID from the store DB 304. Furthermore, the customer ID acquisition unit 101 sends a collation effectiveness notification representing that the collation is effective, to the detection device 301. When the identifying IDs do not match, the customer ID acquisition unit 101 sends a collation effectiveness notification representing that the collation is ineffective, to the detection device 301.

The action information generation unit 102 generates action information that represents a customer in the store. Specifically, the customer image captured by the store camera 302 is analyzed to detect an action of a customer as well as the customer and a product, and the action information indicating an action of the customer in the store is generated based on the detected customer, product, and action of the customer. The action information generation unit 102 stores the generated action information in the storage unit 105.

Figure 5:
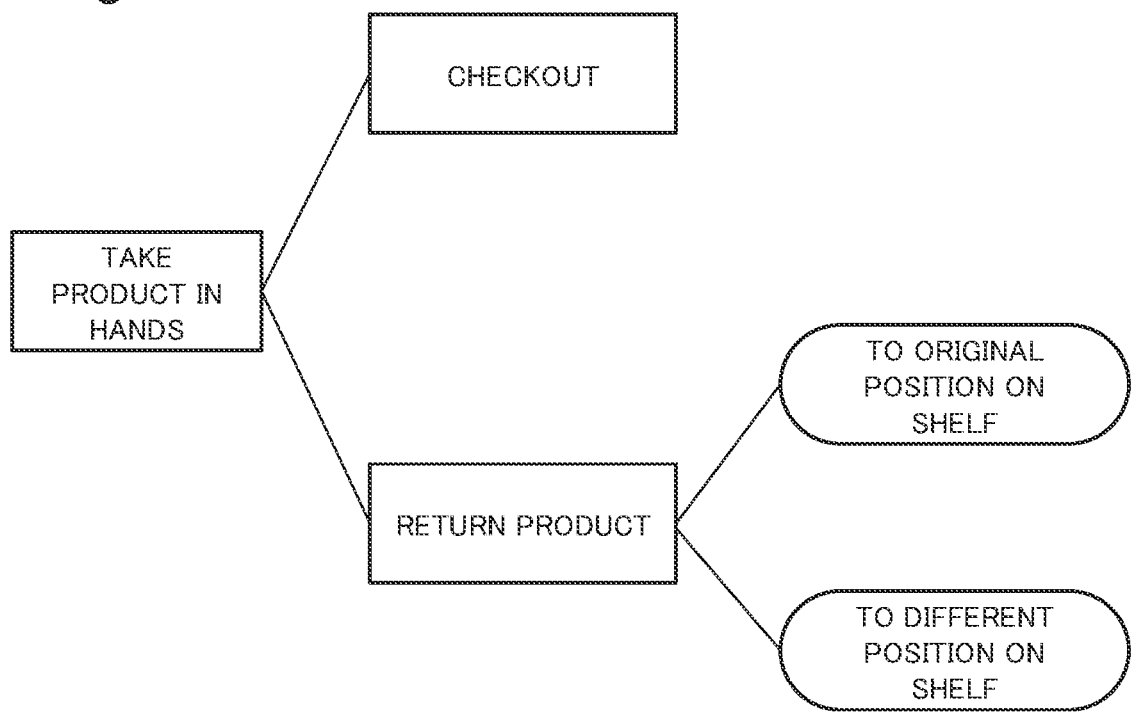
FIG. 5 is a diagram explaining an example of a customer, a product, and actions of the customer.
Figure 6:
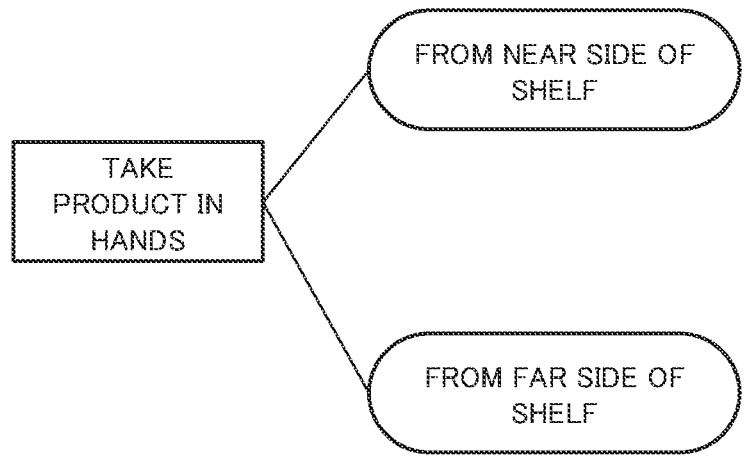
FIG. 6 is a diagram explaining an example of a customer, a product, and actions of the customer.

FIGS. 5 and 6 are diagrams explaining an example of a customer, a product, and actions of the customer. For example, the action of the customer is "take (product) in hands", "return (product)", or the like. When the product is not involved in the action of the customer, the action information generation unit 102 detects the customer and the action of the customer. For example, the action of the customer in this case is "move", "pick up garbage", "drop garbage", and the like. The detection of the customer, the product, and the action of the customer from the customer image is carried out using an existing method or means such as a method based on a background difference or a discriminator that has learned features of the customer and the product.

The action information generation unit 102 extracts the customer feature and the product feature from the customer image, and detects the customer and the product contained in the customer image by referring to the customer feature in the customer information or the product feature in the product information stored in the store DB 304.

The action information generation unit 102 detects whether the customer has taken the product in the hands from "the far side of the shelf" or "the near side of the shelf" by comparing the customer images before and after the customer takes the product in the hands. Specifically, the action information generation unit 102 detects that a product at the top on the product shelf has disappeared between the preceding and following customer images, and detects a motion in which the customer took the product in the hands from "the near side of the shelf", as a motion of the customer. Alternatively, the action information generation unit 102 detects a motion in which the customer took the product from "the far side of the shelf", as the action of the customer by detecting a motion in which the customer stretched out the hand to the far side of the product shelf, from the customer image.

Furthermore, the action information generation unit 102 detects the movement of the customer in the store based on the customer image to detect the movement route of the customer. Existing methods such as a method based on a Kalman filter and a method based on a particle filter are applied to track the movement of the customer.

The action information generation unit 102 stores the generated action information in the storage unit 105 for each time point, together with the customer ID, the shelf ID, and the product ID used to detect the customer, the product, and the action of the customer, in association with each other. FIG. 7 is a data sheet illustrating an example of the action information indicating actions of the customer in the store. The time point is extracted from the capture time point of the customer image.

Figure 8:
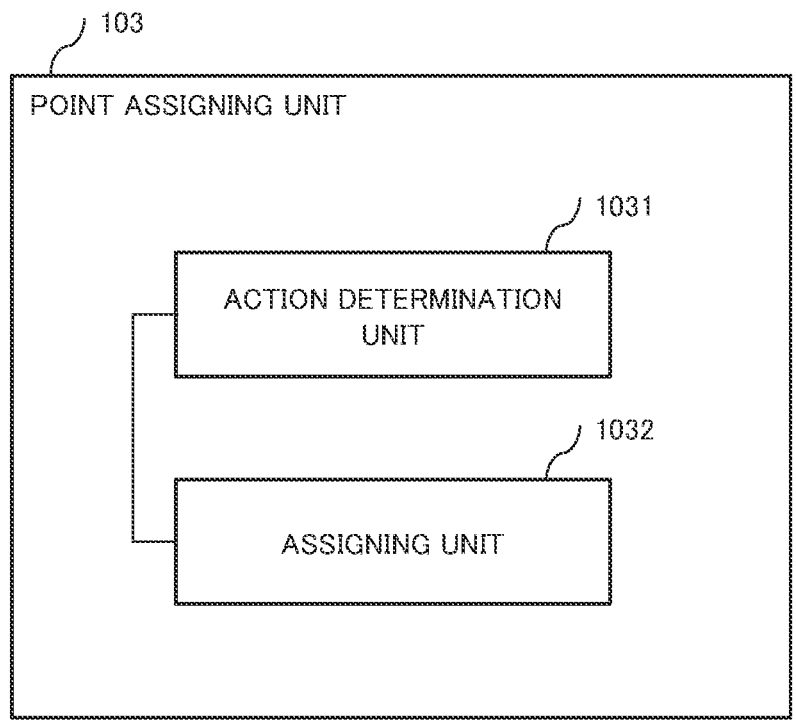
FIG. 8 is a block diagram illustrating an example of the configuration of a point awarding unit of an information processing device.

The point assigning unit 103 assigns the assigned point in association with the customer ID, based on the action information. FIG. 8 is a block diagram illustrating an example of the configuration of the point assigning unit 103. The point assigning unit 103 illustrated in FIG. 8 includes an action determination unit 1031 and an assigning unit 1032.

FIG. 9 is a data sheet illustrating an example of action determination information. The action determination information is stored in the storage unit 105. For each piece of action information indicating the action of the customer in the store, the action determination information defines a first action (to increase the work of the store attendant) or a second action (to reduce the work of the store attendant) as determination information. The action determination unit 1031 refers to the action determination information to determine whether the action information generated by the action information generation unit 102 is the first action that increases the work of the store attendant or the second action that reduces the work of the store attendant.

The action determination information may also define the number of assigned points indicating points to be assigned to the customer according to the action information (or the determination information). In the example in FIG. 9, a negative assigned point is defined for the first action, and a positive number of assigned points is defined for the second action.

The assigning unit 1032 extracts the owned points linked with the customer ID from the store DB 304, and assigns a number of assigned points according to the action information (or the determination information) to the extracted owned points.

The definition of the number of assigned points to be assigned to the customer according to the action information (or the determination information) is not limited to the example of the action determination information illustrated in FIG. 9. The number of assigned points may be varied according to the time range when the store is crowded, the size of the store, and the number of store attendants of the store. For example, negative points larger than usual may be assigned to an action of the customer that expands the work of the store attendant in a time range when the store is mixed. The number of assigned points may be varied according to the number of store visits (daily, monthly, or yearly) of the customer. The term "store visit" represents a set of entering and leaving the store of a customer, and the number of store visits indicates the number of times when an event from when a customer enters the store to when the customer leaves the store is treated as one set. For example, a case where the customer does not leave the store in a state in which the customer has entered the store in one day is not included in the number of store visits.

The output unit 104 generates the point information for each store visit of the customer, as the result of point assigning based on the action of the customer in the store, and outputs the generated point information to the mobile terminal 200 of the customer. The output unit 104 refers to, for example, information stored in the store DB 304 to generate the point information. The point information contains the customer ID, a point assigned to each piece of action information and the sum of the assigned points, and the updated owned points. The point information may include the action information or the determination information (for example, the first action or the second action) of the customer in the store.

In this manner, by assigning the point according to the action of the customer in the store, it is possible to make the customer aware of the action in the store and lead this to a reduction in work of the store attendant. The owned points may be changed into various services available at the store. As the services provided by the store are diversified in relation to the owned points, customers are made aware of expanding the number of owned points. As a consequence, the action of the customer in the store will often shift to such an action of the customer that reduces the work of the store attendant.

Figure 10:
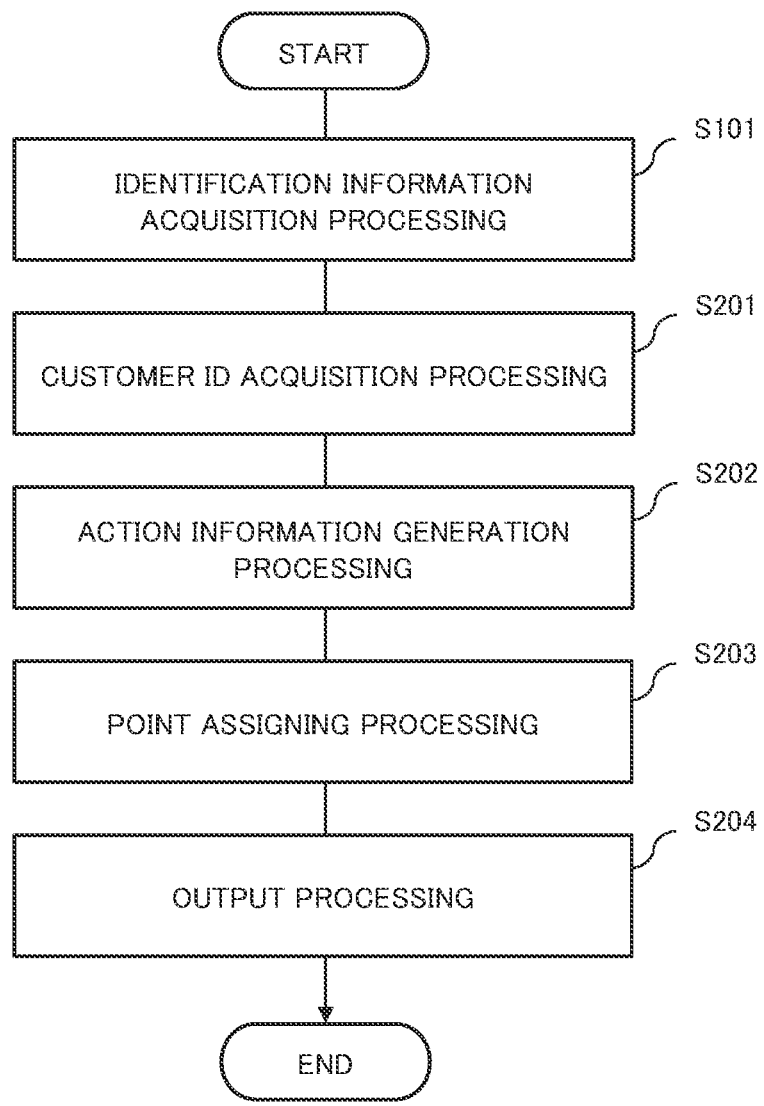
FIG. 10 is a diagram illustrating an example of the operation of the information processing system according to the first example embodiment.

An operation of the information processing system according to the first example embodiment will be described with reference to the drawings. FIG. 10 is a flowchart illustrating an operation of the information processing system according to the first example embodiment.

Before entering the store, the customer holds the mobile terminal 200 used by the customer over the detection device 301 in the store, and causes the detection device 301 to read the RF tag 204 provided on the mobile terminal 200. The detection device 301 detects the identifying ID stored in the RF tag 204 and transmits the identifying ID to the information processing device 100 (step S101).

In the information processing device 100, the customer ID acquisition unit 101 collates the detected identifying ID with the identifying ID stored in the store DB 304. When the identifying IDs match, the customer ID acquisition unit 101 acquires the customer ID associated with the identifying ID from the store DB 304. With the acquisition of the customer ID, the information processing device 100 finds that the customer has entered the store. The customer ID acquisition unit 101 sends the acquired customer ID to the action information generation unit 102.

When the identifying ID is transmitted from the detection device 301, the customer ID acquisition unit 101 of the information processing device 100 acquires the customer ID that identifies the customer who uses the store (step S201). Specifically, the customer ID acquisition unit 101 collates the identifying ID detected by the detection device 301 with the identifying ID of the customer stored in advance in the store DB 304. When the identifying IDs match, the customer ID acquisition unit 101 acquires the customer ID associated with the identifying ID from the store DB 304.

Upon receiving the customer image captured by the store camera 302, the action information generation unit 102 of the information processing device 100 analyzes the customer image to detect the action of the customer as well as the customer and the product. Based on the detected customer, product, and action of the customer, the action information indicating the action of the customer in the store is generated (step S202). The action information generation unit 102 stores the generated action information in the storage unit 105 for each time point, together with the customer ID, the shelf ID, and the product ID used to detect the customer, the product, and the action of the customer, in association with each other.

The point assigning unit 103 of the information processing device assigns the assigned point in association with the customer ID, based on the action information stored in the storage unit 105 (step S203). Specifically, the action determination unit 1031 of the point assigning unit 103 refers to the action determination information to determine whether the action information generated by the action information generation unit 102 is the first action that increases the work of the store attendant or the second action that reduces the work of the store attendant. The action determination information is information that defines the first action (to increase the work of the store attendant) or the second action (to reduce the work of the store attendant) as determination information, for each piece of action information indicating the action of the customer in the store.

Furthermore, the assigning unit 1032 of the point assigning unit 103 extracts the owned points linked with the customer ID from the store DB 304, and assigns a number of assigned points according to the action information (or the determination information) to the extracted owned points. The number of assigned points indicating points to be assigned to the customer according to the action information (or the determination information) may be defined in the action determination information.

The output unit 104 refers to the updated information stored in the store DB 304 to generate the point information for each store visit of the customer, as the result of point assigning based on the action of the customer in the store, and outputs the generated point information to the mobile terminal 200 of the customer (step S204). The point information contains the customer ID, a point assigned to each piece of action information and the sum of the assigned points, and the updated owned points.

(Modifications)

In the present example embodiment, biometric information on the customer may be used instead of the identifying ID contained in the RF tag of the mobile terminal 200. In this case, the detection device 301 uses a biometric information sensor that detects biometric information for identifying an individual, such as a camera, a fingerprint sensor, or an iris sensor, instead of an RF reader. When a customer is detected by biometric authentication, the customer does not need to carry the mobile terminal 200 for customer identification.

In the explanation of the above example embodiment, description has been made using an example of the product shelf, but the example embodiment is not limited to this example. Display fixtures including a product shelf, a display fence, or a showcase may be employed.

A point-of-sale (POS) device (not illustrated) installed in the store may provide various sorts of services to the customer, according to the owned points of the customer stored in the store DB 304. Specifically, the POS device may receive the owned points from the store DB 304 based on the customer ID and apply the received owned points to product sales according to the owned points. For example, some or all of the owned points may be converted into an amount of money, and a point discount such as discounting the payment amount of the customer by the converted amount of money may be carried out.

The POS device stores, in the store DB 304, the remaining points obtained by subtracting points consumed for the point discount of the POS device from the owned points acquired from the store DB 304.

The POS device (not illustrated) may receive the owned points of the customer from the information processing device 100 and print the received owned points via a printing device (not illustrated).

(Effects of First Example Embodiment)

The information processing device 100 can make the customer aware of an action of the customer that increases or decreases the work of the store attendant in the store, by increasing or decreasing the owned points of the customer based on the action of the customer in the store. The action of the customer to expand the number of owned points leads to a reduction in work of the store attendant, and a service that is beneficial to both the customer and the store attendant can be provided.

Second Example Embodiment

An information processing device according to a second example embodiment will be described with reference to the drawings. The second example embodiment is an aspect in which the information processing device 100 in the information processing system of the first example embodiment is implemented with a minimum configuration.

Hereinafter, the information processing device of the second example embodiment will be described as an aspect in which the information processing device 100 in the information processing system of the first example embodiment is replaced with the information processing device of the second example embodiment. Therefore, components similar to the information processing device 100, the mobile terminal 200, the detection device 301, the store camera 302, and the store DB 304 are denoted by the same reference numerals, and a detailed description thereof will be omitted.

Figure 11:
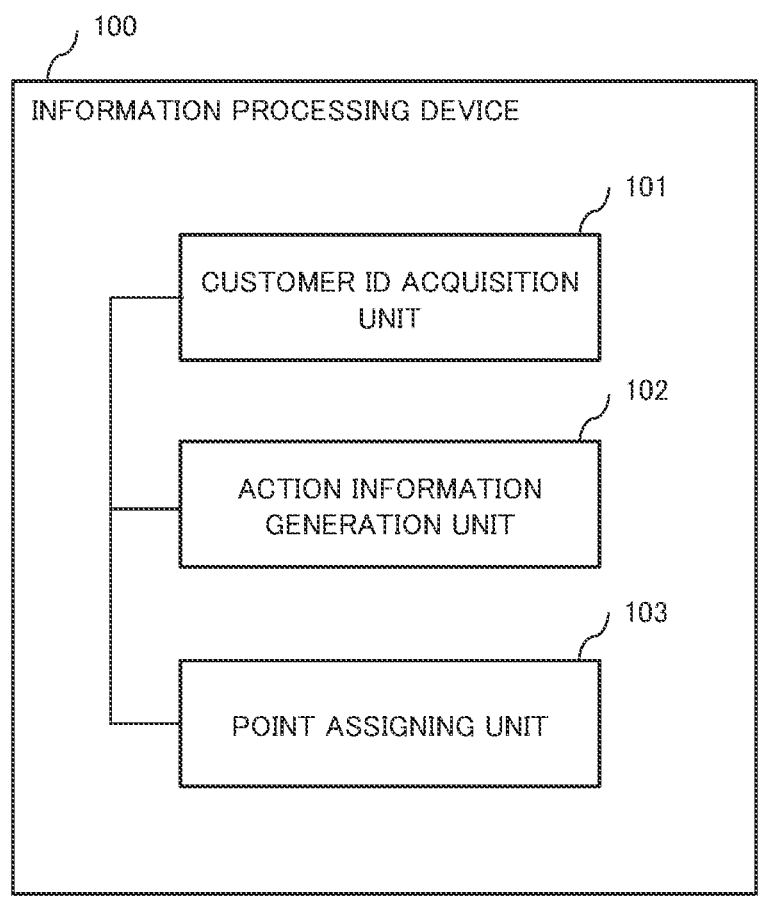
FIG. 11 is a block diagram illustrating an example of the configuration of an information processing device according to a second example embodiment.

FIG. 11 is a block diagram illustrating the information processing device according to the second example embodiment. An information processing device 100 illustrated in FIG. 11 includes a customer ID acquisition unit 101, an action information generation unit 102, and a point assigning unit 103. The customer ID acquisition unit 101 acquires the customer ID of a customer who uses the store. The action information generation unit 102 generates action information that represents the action of the customer in the store. The point assigning unit 103 assigns a point in association with the customer ID, based on the action information.

Figure 12:
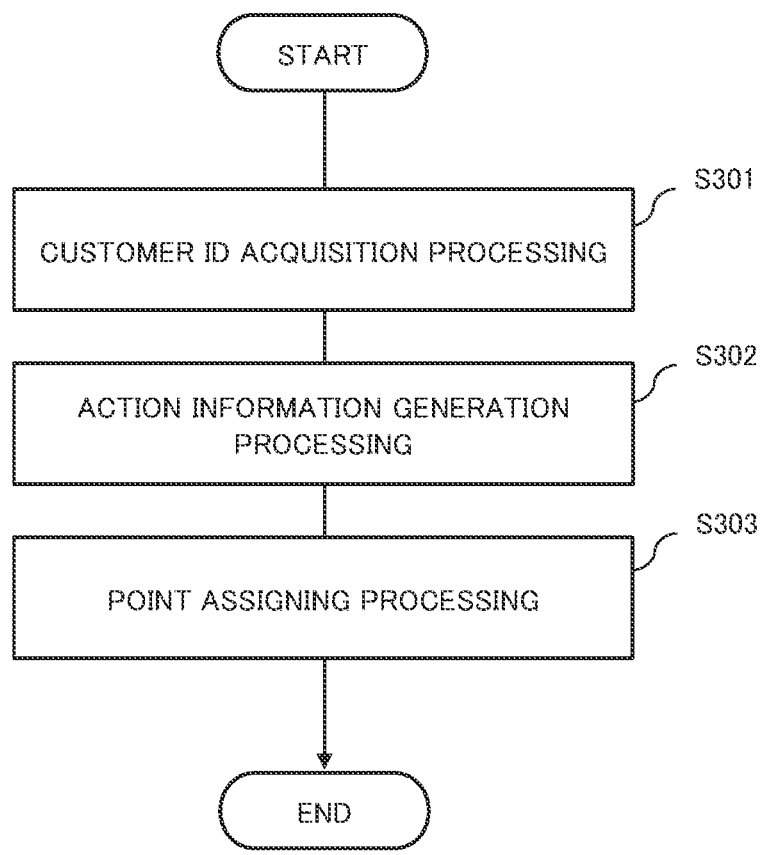
FIG. 12 is a flowchart illustrating an example of the operation of the information processing device according to the second example embodiment.

Next, an operation of the second example embodiment will be described with reference to the drawings. FIG. 12 is a flowchart illustrating an example of the operation of the second example embodiment. The customer holds the mobile terminal used by the customer over the detection device in the store. The detection device acquires the identifying ID from the mobile terminal and transmits the acquired identifying ID to the information processing device 100. The customer ID acquisition unit 101 of the information processing device 100 acquires the customer ID of the customer who uses the store, based on the received identifying ID (step S301). For example, the customer ID acquisition unit 101 acquires the customer ID from a storage device (not illustrated).

The action information generation unit 102 generates action information that represents the action of the customer in the store, based on the customer ID (step S302).

For example, the action information generation unit 102 refers to the customer ID stored in the storage device (not illustrated) to generate the action information. The point assigning unit 103 assigns a point in association with the customer ID, based on the generated action information (step S303). For example, the point assigning unit 103 may extract the owned points linked with the customer ID from the storage unit (not illustrated) and assign the point to the extracted owned points.

According to the second example embodiment, the information processing device 100 can make the customer aware of an action of the customer that increases or decreases the work of the store attendant in the store, by generating the action information that represents the action of the customer in the store and assigning a point in association with the customer ID, based on the action information. The action of the customer to expand the number of owned points leads to a reduction in work of the store attendant, and a service that is beneficial to both the customer and the store attendant can be provided.

(Hardware Configuration)

In each of the example embodiments described above, each constituent element of the information processing device 100 and the mobile terminal 200 indicates a block in units of functions. Some or all of multiple constituent elements of each device may be achieved by any combination of a computer and a program.

Figure 13:
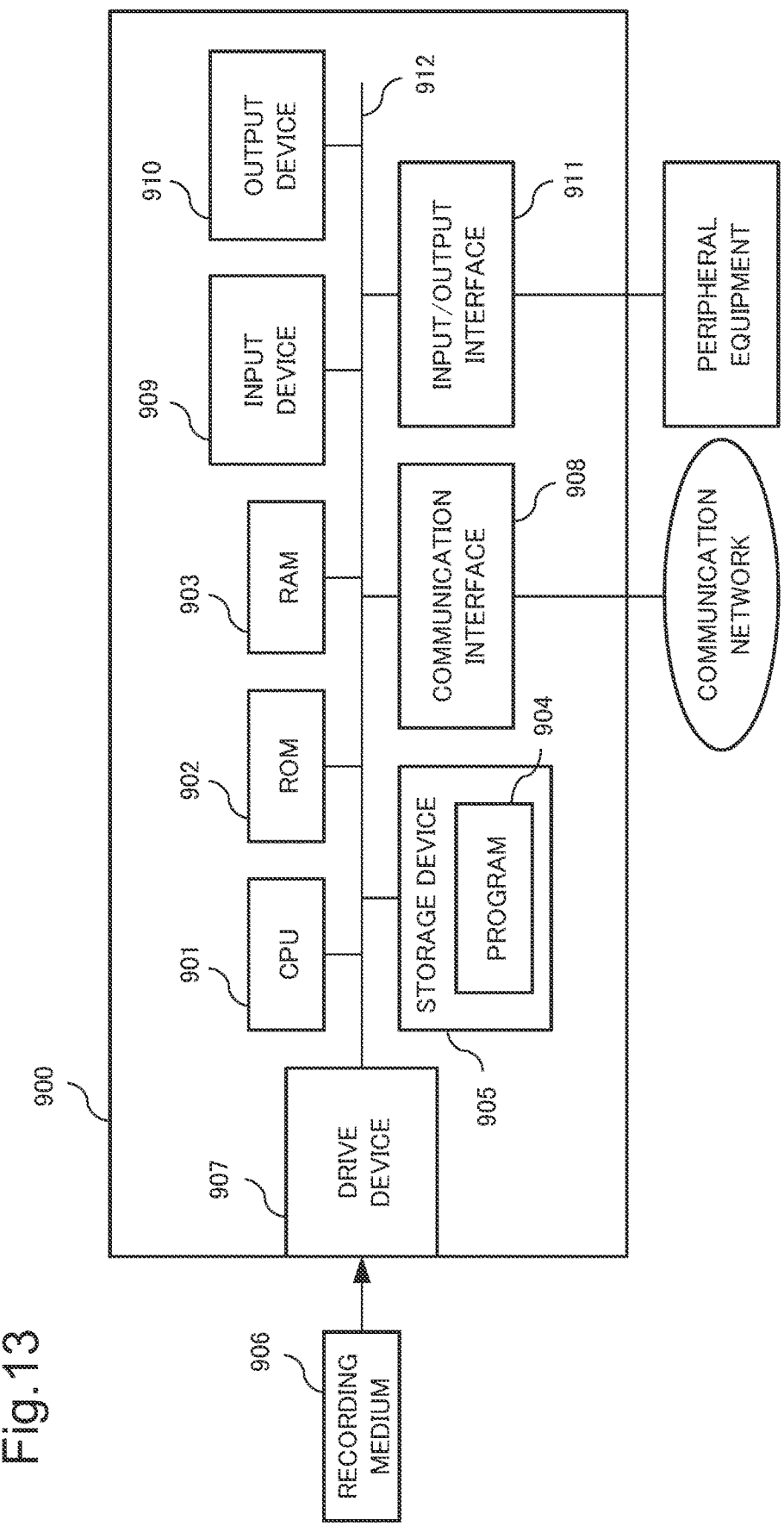
FIG. 13 is a block diagram illustrating an example of a hardware configuration of a computer.

FIG. 13 is a block diagram illustrating an example of a hardware configuration of a computer. Referring to FIG. 13, the computer 900 includes, for example, a central processing unit (CPU) 901, a read only memory (ROM) 902, a random access memory (RAM) 903, a program 904, a storage device 905, a drive device 907, a communication interface 908, an input device 909, an output device 910, and a bus 912.

The program 904 contains an instruction for achieving each function of each device. The program 904 is saved in advance in the ROM 902, the RAM 903, or the storage device 905. The CPU 901 achieves each function of each device by executing an instruction contained in the program 904. For example, the CPU 901 of the information processing device 100 executes an instruction contained in the program 904, thereby achieving the function of each component of the customer ID acquisition unit 101, the action information generation unit 102, and the point assigning unit 103. The RAM 903 may temporarily store data processed in each function of each device.

The drive device 907 performs reading and writing on a recording medium 906. The communication interface 908 provides an interface with a communication network. For example, the input device 909 is a mouse, a keyboard, or the like and accepts an input of information from a customer, an employee, or the like. The output device 910 is, for example, a display and outputs (displays) information to a customer, an employee, or the like. An input/output interface 911 provides an interface with peripheral equipment. In the case of the information processing device 100, a camera, a barcode reader, a tag reader/writer, and a card reader/writer may be connected to the input/output interface 911. The bus 912 connects these respective constituent elements of the hardware. The program 904 may be supplied to the CPU 901 via the communication network, or may be saved in advance in the recording medium 906 in such a way as to be read out and supplied to the CPU 901 by the drive device 907.

The hardware configuration illustrated in FIG. 13 is an example, and a constituent element other than those illustrated may be added or some constituent elements may not be included.

The method of achieving each device has various modifications. For example, each device may be achieved by any combinations of computers and programs different from each other per constituent element. A plurality of constituent elements included in each device may be achieved by any one combination of a computer and a program.

Some or all of multiple constituent elements of each device may be achieved by general or dedicated circuitry including a processor or the like or a combination of these pieces of circuitry. These pieces of circuitry may be constituted by a single chip or a plurality of chips connected via a bus. Some or all of multiple constituent elements of each device may be achieved by a combination of the circuitry or the like described above and a program.

In a case where some or all of multiple constituent elements of each device are achieved by a plurality of computers, pieces of circuitry, or the like, the plurality of computers, pieces of circuitry, or the like may be centrally arranged or dispersedly arranged.

In each example embodiment, the steps describing the series of pieces of processing described above include not only processing performed in chronological order as in the described order, but also processing that is executed in parallel or individually even when not necessarily processed in chronological order.

The present disclosure is not limited to each of the above-described example embodiments, and a variety of modifications can be made. An example embodiment obtained by appropriately combining configurations, operations, and processing disclosed in different example embodiments is also included in the technical scope of the present disclosure.

Each example embodiment described above is merely an example of embodying the present disclosure, and a variety of modifications can be made within the scope of the gist of the present disclosure described in the claims.

Some or all of the above example embodiments can also be described as in the following supplementary notes, but are not limited to the following.

(Supplementary Note 1)

An information processing device including:
a customer ID acquisition means for acquiring a customer identifier (ID) that identifies a customer who uses a store;
an action information generation means for generating action information that represents an action of the customer in the store; and
a point assigning means for assigning points in association with the customer ID based on the action information.

(Supplementary Note 2)

The information processing device according to supplementary note 1, in which
the action information generation means generates the action information, based on a customer image obtained by capturing the customer with a store camera.

(Supplementary Note 3)

The information processing device according to supplementary note 2, in which the action information generation means detects the customer and an action of the customer in the customer image, and generates the action information.

(Supplementary Note 4)

The information processing device according to supplementary note 2, in which
the customer image includes the customer and a product displayed on a display fixture of the store, and
the action information generation means detects the customer, the product, and the action of the customer in the customer image, and generates the action information.

(Supplementary Note 5)

The information processing device according to any one of supplementary notes 1 to 4, further including
an action determination means for determining, based on the action information, whether the action of the customer is a first action that increases work of a store attendant of the store or a second action that reduces work of the store attendant.

(Supplementary Note 6)

The information processing device according to supplementary note 5, in which
the action determination means refers to action determination information in which the action of the customer and an increase or a reduction in work of the store attendant are associated with each other, to determine whether the action information generated is the first action or the second action.

(Supplementary Note 7)

The information processing device according to any one of supplementary note 5 or 6, in which
the point assigning means assigns a point that decreases owned points of the customer when a result of the determination is the first action, and assigns a point that increases the owned points of the customer when a result of the determination is the second action.

(Supplementary Note 8)

The information processing device according to any one of supplementary notes 1 to 7, further including
an output means for outputting owned points of the customer, the action information, and a point assigned based on the action information.

(Supplementary Note 9)

A processing method including:
acquiring a customer ID that identifies a customer who uses a store;
acquiring action information that represents an action of the customer in the store; and
assigning points in association with the customer ID based on the action information.

(Supplementary Note 10)

A program for causing a computer to execute:
acquiring a customer ID that identifies a customer who uses a store;

acquiring action information that represents an action of the customer in the store; and assigning points in association with the customer ID based on the action information.

(Supplementary Note 11)

An information processing system including:

an information processing device that includes: a customer ID acquisition means for acquiring a customer ID that identifies a customer who uses a store;

an action information generation means for generating action information that represents an action of the customer in the store; and a point assigning means for assigning points in association with the customer ID based on the action information; and a mobile terminal that receives point information regarding the points from the information processing device.

This application is based upon and claims the benefit of priority from Japanese patent application No. 2019-055883, filed on Mar. 25, 2019, the disclosure of which is incorporated herein in its entirety by reference.

[Reference Signs List]
- 100 information processing device
- 101 customer ID acquisition unit
- 102 action information generation unit
- 103 point assigning unit
- 1031 action determination unit
- 1032 assigning unit
- 104 output unit
- 105 storage unit
- 200 mobile terminal
- 201 communication unit
- 202 display control unit
- 203 display unit
- 204 RF tag
- 301 detection device
- 302 store camera
- 304 store DB
- 900 computer
- 901 CPU
- 902 ROM
- 903 RAM
- 904 program
- 905 storage device
- 906 recording medium

What is claimed is:

1. A system comprising:

a radio-frequency identification (RFID) reader installed at an entrance of a store to detect RFID tags of mobile terminals of a plurality of customers as the plurality of customers enter and exit the store through the entrance;

a plurality of cameras installed in the store and organized over a first column to a first side of a plurality of product shelves in the store and a second column to a second side of the product shelves, each camera in the first column having an imaging region covering a first portion of a corresponding pair of product shelves facing one another, each camera in the second column having an imaging region covering a second portion of a corresponding pair of product shelves facing one another;

at least one processor; and at least one memory storing instructions executable by the at least one processor to:

identify which of the plurality of customers are currently present in the store based on the RFID reader detecting the RFID tags of the mobile terminals of the plurality of customers as the plurality of customers enter and exit the store through the entrance;

as each customer of the plurality of customers enters the store through the entrance, retrieve a customer identifier (ID) and a customer feature of the each customer from a database based on an ID of the RFID tag of a mobile terminal of the each customer detected by the RFID reader;

identify that a customer, of those of the plurality of customers that have been identified as currently present in the store, is performing an action regarding a product on a shelf in the store, by detecting the customer feature of the customer, which has been retrieved from the database when the customer entered the store through the entrance, within images captured by the camera having the imaging region including the shelf, detecting the product within the images, and detecting the action within the images;

generate action information representing the action based on the customer that has been identified as performing the action regarding the product on the shelf in the store, the detected product, and the detected action;

store the generated action information in a storage unit;

determine, based on the generated action information, whether the action of the customer reduces work of a store attendant, wherein the action that reduces the work of the store attendant includes at least either one of the customer removing the product from a front of the shelf or the customer returning the product to an original position on the shelf;

add one or more points to a point total of the customer as stored in association with the customer ID in the database, when the action of the customer is determined to reduce the work of the store attendant, to update the point total of the customer; and output the updated point total to the mobile terminal of the customer.

2. The information processing device according to claim 1, wherein the instructions are executable by the at least one processor to: determine whether the action of the customer reduces the work of the store attendant by determining whether the action is a first action that increases the work of the store attendant or is a second action that reduces the work of the store attendant.

3. The information processing device according to claim 2, wherein the instructions are executable by the at least one processor to: refer to action determination information in which the action of the customer and an increase or a reduction in the work of the store attendant are associated with each other, to determine whether the generated action information is the first action or the second action.

4. The information processing device according to claim 2, wherein the instructions are executable by the at least one processor to further:

decrease the point total of the customer when the action of the customer is determined as the first action, and increase the point total of the customer when the action of the customer is determined as the second action.

5. The information processing device according to claim 1, wherein the instructions are executable by the at least one processor to further:

increase the point total of the customer, the action information, and a point assigned based on the action information.

6. A processing method performed by a processor and comprising:
identifying which of a plurality of customers are currently present in a store based on a radio-frequency identification (RFID) reader detecting RFID tags of mobile terminals of the plurality of customers as the plurality of customers enter and exit a store through an entrance of the store, the RFID reader installed at the entrance;
as each customer of the plurality of customers enters the store through the entrance, retrieving a customer identifier (ID) and a customer feature of the each customer from a database based on an ID of the RFID tag of the mobile terminal of the each customer detected by the RFID reader;
identifying that a customer, of those of the plurality of customers that have been identified as currently present in the store, is performing an action regarding a product on a shelf in the store, by detecting the customer feature of the customer, which has been retrieved from the database when the customer entered the store through the entrance, within images captured by the camera having the imaging region including the shelf, detecting the product within the images, and detecting the action within the images;
    wherein the camera is one of a plurality of cameras installed in the store and organized over a first column to a first side of a plurality of product shelves in the store and a second column to a second side of the product shelves, each camera in the first column having an imaging region covering a first portion of a corresponding pair of product shelves facing one another, each camera in the second column having an imaging region covering a second portion of a corresponding pair of product shelves facing one another;
generating action information representing the action based on the customer that has been identified as performing the action regarding the product on the shelf in the store, the detected product, and the detected action;
storing the generated action information in a storage unit;
determining, based on the generated action information, whether the action of the customer reduces work of a store attendant, wherein the action that reduces the work of the store attendant includes at least either one of the customer removing the product from a front of the shelf or the customer returning the product to an original position on the shelf;
adding one or more points to a point total of the customer as stored in association with the customer ID in the database, when the action of the customer is determined to reduce the work of the store attendant, to update the point total of the customer; and
outputting the updated point total to the mobile terminal of the customer.

7. A non-transitory computer-readable recording medium storing a program for causing a computer to execute:
identifying which of a plurality of customers are currently present in a store based on a radio-frequency identification (RFID) reader detecting RFID tags of mobile terminals of the plurality of customers as the plurality of customers enter and exit a store through an entrance of the store, the RFID reader installed at the entrance;
as each customer of the plurality of customers enters the store through the entrance, retrieving a customer identifier (ID) and a customer feature of the each customer from a database based on an ID of the RFID tag of the mobile terminal of the each customer detected by the RFID reader;
identifying that a customer, of those of the plurality of customers that have been identified as currently present in the store, is performing an action regarding a product on a shelf in the store, by detecting the customer feature of the customer, which has been retrieved from the database when the customer entered the store through the entrance, within images captured by the camera having the imaging region including the shelf, detecting the product within the images, and detecting the action within the images;
    wherein the camera is one of a plurality of cameras installed in the store and organized over a first column to a first side of a plurality of product shelves in the store and a second column to a second side of the product shelves, each camera in the first column having an imaging region covering a first portion of a corresponding pair of product shelves facing one another, each camera in the second column having an imaging region covering a second portion of a corresponding pair of product shelves facing one another;
generating action information representing the action based on the customer that has been identified as performing the action regarding the product on the shelf in the store, the detected product, and the detected action;
storing the generated action information in a storage unit;
determining, based on the generated action information, whether the action of the customer reduces work of a store attendant, wherein the action that reduces the work of the store attendant includes at least either one of the customer removing the product from a front of the shelf or the customer returning the product to an original position on the shelf;
adding one or more points to a point total of the customer as stored in association with the customer ID in the database, when the action of the customer is determined to reduce the work of the store attendant, to update the point total of the customer; and
outputting the updated point total to the mobile terminal of the customer.

* * * * *